United States Patent Office 3,549,564
Patented Dec. 22, 1970

3,549,564
MODIFIED POLYURETHANE FOAMS
FOR FUEL-FIRE
John A. Parker, Los Altos, and Salvatore R. Riccitiello,
San Jose, Calif., assignors to the United States of America as represented by the Administrator of the National Aeronautics and Space Administration
Filed Feb. 5, 1968, Ser. No. 702,967
Int. Cl. C08g 22/44
U.S. Cl. 260—2.5
8 Claims

ABSTRACT OF THE DISCLOSURE

The invention relates to flame retardant and flame suppressant materials. The main structure of the material is a rigid or semi-rigid polyurethane foam, preferably of a highly branched structure, in which are incorporated one or more materials to impart special properties. One of the added materials is an alkyl halide resin such as polyvinyl chloride which is capable of splitting off HCl and forming a polyene on heating. Other materials which may be, and preferably are, added are cetain inorganic salts (e.g., potassium fluoborate) an encapsulated volatile halogen compounds such as trifluorotrichloroethane.

---

Figure 1:
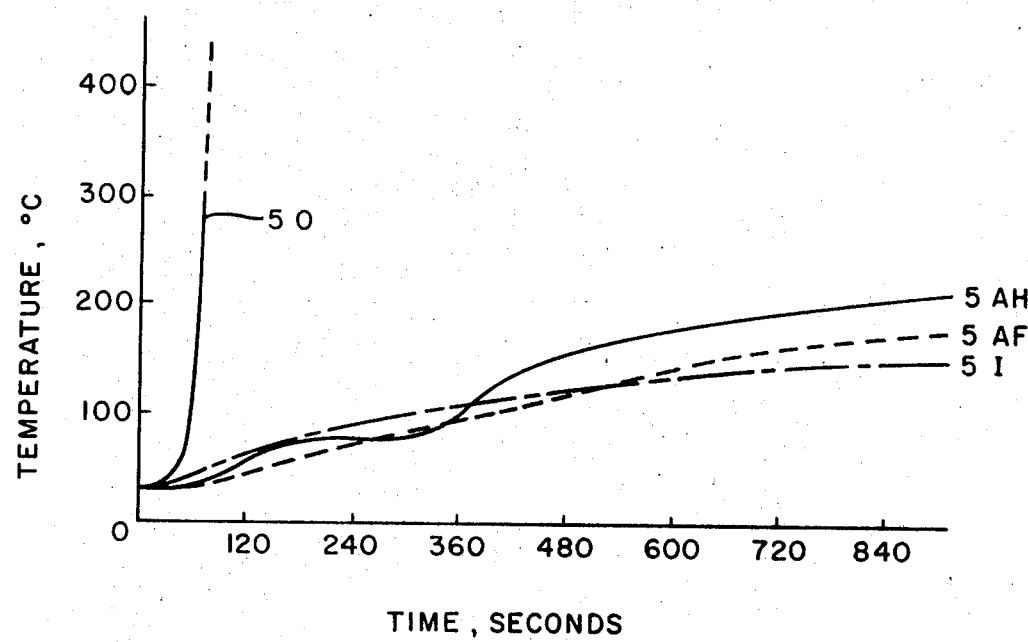

The invention described herein was made by employees of the United States Government and may be manufactured and used by or for the Government for governmental purposes without the payment of any royalties thereon or therefor.

This invention relates to the modification of closed cell rigid and semi-rigid polyurethane foams in the density range from 0.50 to 50 pounds per cubic foot. Specifically, it relates to the modification of certain classes of polyurethanes with alkyl halide resins, inorganic salts, and encapsulated volatile and reactive halogen bearing molecules. These modifications can be made without unduly affecting the desirable mechanical, physical, and thermal insulating qualities of the polyurethane foam.

The modified foams herein described are useful in providing effective protection for thermally sensitive structures against the destructive action of fuel-fires. For this reason these foams may find broad application in both military and commercial fields.

Conventional polyurethane foams are flammable, forming little char residue and producing large volumes of combustible noxious gases. Improvements in conventional foams to make them more resistant to burning have been made by the addition of phosphates, chlorowax and the like for application as insulation and structural members. State of the art modifications have improved the non-burning characteristics of foams but this has not improved the ability of these materials to withstand the action of a sustained fuel-fire. Conventional foams are unsatisfactory in providing the desired protection for such things as military aircraft when penetrated by incendiary bullets in areas external to fuel tanks.

It is an objective of the present invention to provide a new class of foam plastic materials which provide thermal protection because of their excellent insulation properties and also function as a fire-suppressant system.

Another objective of the present invention is to provide low density foam plastics which can function as ablative heat shield materials for low heating environments.

Other objectives of the invention will be apparent from the ensuing description and the appended claims.

In accordance with the present invention a closed cell, rigid or semi-rigid polyurethane foam is employed as a basic foam forming matrix, although preferably it is a foam of a certain type as described hereinafter. In this foam, during or prior to forming the foam, there may be added three types or combination of types, of modifying agents. These include (1) a certain class of alkyl halide resins, (2) a certain class of inorganic salts and (3) encapsulated halogen bearing volatile molecules. New and improved materials are provided by the use of (1) alone in the polyurethane but it is preferred to use all three classes of additives.

The preferred polyurethane foam is formed by reacting a polycyclic aromatic polyisocyanate, drawn from the class of isocyanates represented by the general structural formula as follows:

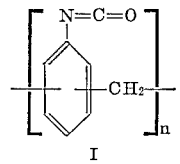

I where $n$ varies from 2 to 10, with a multifunctional polyol, performed from the reaction of propylene oxide with a multifunctional polyol, with a hydroxyl functionality greater than four, of the general structure

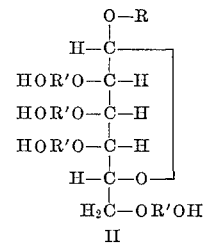

II where R may be methyl as in the case of methyl glucoside and R′ a propylene radical.

Both the polycyclic aromatic character of the isocyanate and the highly branched functionality of the polyol are pre-requisite for obtaining the desired high char yield and integrity as well as low molecular weight non-combustible species. However, the particular polycyclic aromatic polyisocyanate I and polyol II need not be used. For example other ring systems may be used instead of the benzene ring in I (e.g., naphthlene and heterocyclic rings) and the aromatic ring may be substituted as by methyl and chloro substituents.

In II the base, so to speak, is indicated as a hexose derivative which may be referred to as a glycoside. In the selected glycoside, R may be methyl or other alkyl or an aryl group, or it may be another saccharide unit (e.g., as in sucrose); or the glycoside base may be replaced by oxidation products (e.g., gluconic acid) or reduction products (e.g., sorbitol); or the polyol base may be any suitable halogen substituted (chlorendic acid) or unsubstituted polyhydric alcohol having a sufficient number (e.g., 4 or more) available hydroxyl groups. Also, the isopropylene entity

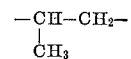

may be replaced with other groups, e.g., the ethylene entity, —CH₂—CH₂—. Also R may be hydrogen.

Suitable commercially available isocyanates such as Mondur MR in which $n$ is greater than 2, with an isocyanate content of 32%, may be reacted with a commercially available polyol, such as Pluracol 201, the oxy-propylene derivative of methyl glucoside. Pluracol 201 is the trade name of Wyandotte Chemicals for polyoxypropylene derivatives of methyl glucoside corresponding to Formula II above. Pluracol 230 may also be used which employs sucrose in place of methyl glucoside. Mondur MR is the trade name of Mobay Chemicals for a polycyclic aromatic polyisocyanate corresponding to Formula I above.

The preferred alkyl halide resin (1) is polyvinyl chloride (or a copolymer of vinyl chloride with a non-halogen bearing monomer such as vinyl acetate and/or other monomers such as maleic anhydride) in the form of a particulate dispersion. The preferred resin is VMCH, which is a tercopolymer of vinyl chloride, vinyl acetate and maleic anhydride. (VMCH is a trademark of Carbide Chemical Corp.) Other halogen bearing polymers may be used which like the polyvinyl chloride polymers and copolymers are capable, upon heating at temperatures in the range of 100 to 300° C., of splitting off hydrogen chloride and producing a reactive polyene. Polyvinylidene chloride and neoprene may also be used.

As stated, the foam also preferably contains an inorganic salt (2) as another discontinuous phase. The preferred salt is potassium fluoborate ($KBF_4$), but other salts which dissociate such as ammonium bicarbonate, ammonium chloride, potassium silicofluoride, ammonium fluoborate, sodium chloride and sodium bicarbonate can be used.

As stated, the foam may also contain (3) encapsulated volatile halogen containing molecules in addition to the aforementioned components. This modification of the closed cell, rigid or semi-rigid foam is preferred for those applications in which fuel-fire quenching or highly active suppression is more desirable than sustained fire protection. The preferred encapsulants are Freon 113 (trifluorotrichloroethane) and the bromofluoro alkanes. (Freon is a trade name of Du Pont.) Encapsulation is achieved by coascervation with gelatin, polyvinyl alcohol, or other suitable film-former as carried out by National Cash Register Company. See for example Green, U.S. Pat. 2,800,457.

In the practice of the present invention, conventional methods of frothing, spraying, and pour in place to form foams are used. Also conventional blowing agents such as Freon 11, catalysts such as triethylene diamine, in the form of Dabco 33-LV, and surfactants such as DC-195 silicone lubricants are used. (Dabco is a trade name of Houndry Chemical Company.) Various methods of incorporating these modifying agents will be apparent to and may be employed by one skilled in the polyurethane art. The preferred method of this invention is to add all of the modifying agents to the polyol. In the case where the dispersing system used employs gear pump metering, the encapsulated component should be added at the mixing head. This is the preferred order of mixing for all applications.

It has also been found that the desired characteristics of the product are substantially improved if a skin is present on the surface of the product, for example, on the outer exposed surface. Such a skin can be conveniently formed by restraining the expanding foam in a mold whereby the cells at the interface of the foam and the restraining wall of the mold will collapse the foam cells and form such a skin. However, a skin may be applied after the foam has been formed, for example by the application of unblown compositions as described herein. A skin has the desirable effect of distributing heat evenly because, compared to the much more highly porous body of foam, the skin is a better heat conductor, therefore conducts heat rapidly from local hot spots to cooler areas. The skin also acts to distribute the evolution of gases which are formed during charring of the foam. The even distribution of the gases evolved during charring is also advantageous because it sweeps away oncoming hot molecules and absorbs oncoming thermal energy uniformly, thereby preventing or lessening the probability of localized overheating and tunneling which weakens the structure and distorts the foam shape.

It is our belief that the mechanism of charring proceeds as follows: The preferred polyurethane-polyol reaction product is highly branched and cross-linked. When heated, volatile material is expelled and there is further cross-linking and condensation of rings. This cross-linking and ring condensation is catalyzed by the hydrogen halide which is split off from the halogenated polymer. The halogenated polymer also gives rise to a conjugated polyene which enters into condensation reactions and contributes to the yield and stability of the char. The potassium fluoborate decomposes into potassium fluoride and boron trifluoride and the latter decomposes into elemental boron and fluorine. The boron enters into the char structure and stabilizes it. The fluorine has the desirable effect of reacting with free radicals such as hydroxyl radicals which are chain carriers and which act to sustain and propagate combustion. The reaction of fluorine with these chain carrier free radicals suppresses combustion.

The following specific examples will illustrate further the practice and advantages of the invention:

EXAMPLE 1.—URETHANE SYSTEM 5–O

Formulation

| Part A: | Parts by weight |
|---|---|
| Mondur MR [1] | 100 |

| Part B: | |
|---|---|
| Pluracol 201 [2] | 65 |
| Freon 11 ($CCl_3F$) | 37 |
| Surfactant DC 195 (a silicone lubricant) | 0.9 |
| Catalyst Dabco 33LV (triethylene diamine) | 1.4 |

[1] A polymeric polyaryl-polyisocyanate prepared by phosgenation of aniline and formaldehyde in a mineral acid said polyisocyanate having 31.5–32% active —NCO groups and a viscosity of about 200 cps. at 25° C.
[2] A polyoxypropylene derivative of methyl glucoside, having an —OH number of 440.

Procedure: Pluracol, surfactant, catalyst and Freon 11 are weighed into a steel vessel and mixed with a stirrer at 700–900 r.p.m. until blended, about 30 sec. The preweighed Mondur MR is added to the vessel and stirred an additional 20 sec. to insure complete blending. The mixture is transported to a suitable container and let rise. The foam is tack free in 3 to 5 minutes. Let stand for 16 hours before testing.

EXAMPLE 2.—URETHANE SYSTEM 5–D

Formulation

Part A: Mondur MR—100 parts by weight
Part B: As in Example 1 plus 16.5 parts VMCH (a vinyl resin having an approximate composition of 86% vinyl chloride, 13% vinyl acetate, and 1% maleic anhydride).

Procedure: Same as Example 1.

EXAMPLE 3.—URETHANE SYSTEM 5–I

Formulation

Part A: Mondur MR—100 parts by weight
Part B: As in Example 2 plus 16.5 parts $KBF_4$.

Procedure: Same as Example 1.

EXAMPLE 4.—URETHANE SYSTEM 5–AF

Formulation

Part A: Mondur MR—100 parts by weight
Part B: As in Example 3 plus 16.5 parts Freon 113 microspheres prepared by method of U.S. Pat. 2,800,457; encapsulating walls made from gum arabic and gelatin; particle size 100–300 microns; encapsulated material= 85% of weight of capsules; walls cured with glutaraldehyde.

Procedure: Same as Example 1.

EXAMPLE 5.—URETHANE SYSTEM 5–AH

Formulation

Part A: Mondur MR—100 parts by weight
Parts B: As in Example 4 plus 16.5 parts Fyrol 6 trademark of Stauffer Chemical Co., Victor Division, for the compound $(C_2H_5O)_2P(O)CH_2N(CH_2CH_2OH)_2$.

Procedure: Same as Example 1.

Samples of the foam of each of these examples were subjected to identical tests as follows: A 4″ x 4″ x 1½″ slab of foam is adhered to a 0.060 inch steel plate 4″ x 4″ in area. A wing tip Bunsen burner was used at a flow rate of 3 cc. natural gas/minute. The slab was held 1½″ from the burner. The rise of temperature of the back side of the steel plate was noted. The results are set forth in the table below.

| Slab material Example: | Density | Back side temperature time to 120° C., sec | Weight loss, grams | Dimension loss, inch | Remarks |
|---|---|---|---|---|---|
| 1. 5-O | 2.1 | 125 | 5.0 | ¾ | Poor char. |
| 2. 5-D | 2.2 | 375 | 6.0 | ¼ | Very good char. |
| 3. 5-I | 2.5 | 540 | 7.0 | ¼ | Do. |
| 4. 5-AF | 2.2 | 525 | 11.0 | ¼ | Do. |
| 5. 5-AH | 2.2 | 500 | 15.5 | ¼ | Do. |

In each of the foregoing examples, 100 parts of polyisocyanate and 65 parts of polyol were used resulting in approximately 165 parts of polyurethane foam; and each of the additives (alkyl halide resin, inorganic salt and encapsulated halogen bearing material) was added in the amount of 10% of the combined weight of polyisocyanate and polyol, or approximately 10% of the weight of polyurethane foam. Each of the proportions may be varied considerably. In the following table are set forth various proportions that may be used, parts being by weight.

| Material | Parts by weight | Preferred range | Broad range |
|---|---|---|---|
| Foam | 100 | 100 | 100 |
| Alkyl halide resin | 10 | 10-20 | 5-65 |
| Inorganic salt | 10 | 10-30 | 5-65 |
| Encapsulated material | 10 | 10-70 | 5-70 |

The inorganic salt and/or encapsulated material may be omitted altogether as in certain of the examples but it is preferred to have at least one of them and most advantageously both of them present.

It will therefore be apparent that a novel and very useful, polyurethane foam-based heat insulating, fire resistant and suppressant material has been provided.

We claim:

1. A heat insulating and fire retardant and suppressant material in the form of a semi-rigid or rigid polyurethane foam which comprises,
   (a) the reaction product of a polymeric polyaryl polyisocyanate and a polyol ether having a hydroxyl functionality of at least four, said polyolether being a lower alkylene oxide addition product of a polyol selected from the group consisting of lower alkyl glycoside, aryl glycoside, hexose glycoside, gluconic acid, sorbitol, sucrose, and glucose;
   (b) a halogenated polymer uniformly dispersed in said foam, said polymer being selected from the group consisting of poly(vinyl chloride), poly(vinyl chloride-vinyl acetate), poly(vinylidene chloride), poly(vinyl chloride-vinyl acetate-maleic anyhydride), and neoprene; and
   (c) a dissociable inorganic salt selected from the group consisting of potassium fluoborate, ammonium bicarbonate, ammonium chloride, potassium silicofluoride, ammonium fluoborate, sodium chloride, and sodium bicarbonate.

2. The material of claim 1 wherein the alkylene oxide is propylene oxide.

3. The material of claim 1 wherein the lower alkyl glycoside is methyl glycoside.

4. The material of claim 1 wherein the dissociable inorganic salt is potassium fluoborate.

5. The material of claim 1 wherein the halogenated polymer is a copolymer of vinyl chloride, vinyl acetate, and maleic anhydride.

6. The material of claim 1 wherein the halogenated polymer is poly(vinyl chloride).

7. The material of claim 1 wherein the foam includes a substantial amount of an encapsulated, halogenated, volatilizable fire suppressant material.

8. The material of claim 1 wherein the foam is an addition product of a polymeric polyaryl polyisocyanate having 31.5–32% active —NCO groups and a viscosity of about 200 cps. at 25° C. and a polyol formed by the reaction of methyl glycoside and propylene oxide; the halogenated polymer is polyvinyl chloride; wherein said foam also includes uniformly dispersed therein potassium fluoborate and microcapsules of a highly halogenated low molecular weight alkane; the combined proportions of polyvinyl chloride, potassium fluoborate and microcapsules not exceeding about 70% of the weight of the foam and the proportion of each being not less than about 10% of the weight of the foam.

References Cited

UNITED STATES PATENTS

| | | | |
|---|---|---|---|
| 2,800,457 | 7/1957 | Green et al. | 252—316 |
| 3,075,928 | 1/1963 | Lanham | 260—2.5 |
| 3,239,482 | 3/1966 | Rapp | 260—41 |

FOREIGN PATENTS

| | | | |
|---|---|---|---|
| 1,177,816 | 9/1964 | Germany | 260—2.5 |
| 1,490,316 | 6/1967 | France | 260—2.5 |

OTHER REFERENCES

The Condensed Chemical Dictionary, 5th edition (1956), page 502 cited.

HOSEA E. TAYLOR, Primary Examiner

M. J. WELSH, Assistant Examiner